US011485049B2

(12) United States Patent
Provost

(10) Patent No.: US 11,485,049 B2
(45) Date of Patent: Nov. 1, 2022

(54) METHOD FOR IMPREGNATING A FIBROUS PREFORM USING A SEAL, AND METHOD FOR MANUFACTURING A MATRIX REINFORCED BY A FIBROUS PREFORM

(71) Applicant: Safran Aircraft Engines, Paris (FR)

(72) Inventor: Maxime Dominique Thierry Provost, Paris (FR)

(73) Assignee: Safran Aircraft Engines, Paris (FR)

( * ) Notice: Subject to any disclaimer, the term of this patent is extended or adjusted under 35 U.S.C. 154(b) by 746 days.

(21) Appl. No.: 16/317,365

(22) PCT Filed: Jul. 13, 2017

(86) PCT No.: PCT/FR2017/051926
§ 371 (c)(1),
(2) Date: Jan. 11, 2019

(87) PCT Pub. No.: WO2018/011528
PCT Pub. Date: Jan. 18, 2018

(65) Prior Publication Data
US 2019/0299493 A1 Oct. 3, 2019

(30) Foreign Application Priority Data
Jul. 13, 2016 (FR) ...................... 1656713

(51) Int. Cl.
*B29C 70/48* (2006.01)
*B29C 33/00* (2006.01)
*B29C 70/54* (2006.01)

(52) U.S. Cl.
CPC .......... *B29C 33/0038* (2013.01); *B29C 70/48* (2013.01); *B29C 70/54* (2013.01); *B29C 70/545* (2013.01)

(58) Field of Classification Search
CPC ..... B29C 33/038; B29C 70/48; B29C 70/546; B29C 70/548; B29C 70/545
(Continued)

(56) References Cited

U.S. PATENT DOCUMENTS 5,200,257 A 4/1993 Gatarz et al.
6,299,819 B1 * 10/2001 Han ............... B29C 33/0038
264/510
(Continued)

FOREIGN PATENT DOCUMENTS

DE 102013215041 A1 3/2014
DE 102012110353 A1 4/2014
(Continued)

OTHER PUBLICATIONS

International Search Report and Written Opinion dated Nov. 2, 2017, in corresponding International Application No. PCT/FR2017/051926 (16 pages).

Primary Examiner — Jeffrey M Wollschlager
Assistant Examiner — Xue H Liu
(74) Attorney, Agent, or Firm — Bookoff McAndrews, PLLC

(57) ABSTRACT

A method for impregnating a fibrous preform by injection or infusion, comprising steps of: —providing a mold having at least two portions, said mold presenting an inlet orifice and a vent orifice placed on opposite sides of the mold; —placing a fibrous preform in a portion of the mold; —placing a thermo-expandable seal in a passage formed between an inside wall of the mold and the fibrous preform, said passage extending substantially along the direction (X) extending between the opposite sides of the mold; —closing the mold; —heating the mold so that the thermo-expandable seal expands and shuts off said passage; and—impregnating the fibrous preform with an impregnation material.

6 Claims, 3 Drawing Sheets

(58) Field of Classification Search
USPC .................................................. 264/324, 325
See application file for complete search history.

(56) References Cited

U.S. PATENT DOCUMENTS

| | | | |
|---|---|---|---|
| 2015/0343717 A1* | 12/2015 | Graf ........................ | B29C 70/54 |
| | | | 264/152 |
| 2016/0059500 A1* | 3/2016 | Hosokawa .............. | B29C 70/44 |
| | | | 264/257 |

FOREIGN PATENT DOCUMENTS

| | | | |
|---|---|---|---|
| EP | 0785062 | A2 | 7/1997 |
| EP | 2524796 | A1 | 11/2012 |
| JP | H518466 | A | 1/1993 |

* cited by examiner

METHOD FOR IMPREGNATING A FIBROUS PREFORM USING A SEAL, AND METHOD FOR MANUFACTURING A MATRIX REINFORCED BY A FIBROUS PREFORM

CROSS-REFERENCE TO RELATED APPLICATIONS

This application is the U.S. national phase entry under 35 U.S.C. § 371 of International Application No. PCT/FR2017/051926, filed on Jul. 13, 2017, which claims priority to French Patent Application No. 1656713, filed on Jul. 13, 2016.

FIELD OF THE INVENTION

The invention relates to a method for impregnating a fibrous preform by injection or by infusion, and also to a method for fabricating a matrix reinforced by a fibrous preform.

BACKGROUND

Impregnating a fibrous preform by infusion or injection, e.g. by injecting resin, known as resin transfer molding (RTM) injection, generally consists in placing a fibrous preform in a mold, then closing the mold, and introducing an impregnation material into the mold that contains the fibrous preform.

Nevertheless, it can happen that fibers of the fibrous preform become caught between two mold portions, thereby preventing the mold from being closed in sealed manner, so the mold leaks during impregnation.

In order to avoid catching fibers in that way, there exist molds in which the mold portions present anti-catching chamfers that, once the mold is closed, form cavities that are configured to receive the fibers that might impede proper closure of the mold. Another solution consists in using a mold that is significantly larger than the preform, such that the edges of the preform inside the mold are far enough away from the edges of the mold to ensure that no fibers can become caught between two mold portions. Nevertheless, those chamfers or that placing of the preform at a distance from the edges of the mold leads to channels being formed that bypass the preform during impregnation and that can lead to impregnation being of poor quality, thereby having a negative impact on the mechanical performance of the part that is finally fabricated. Specifically, to ensure that impregnation is of good quality, it is necessary for it to be uniform within the fibrous preform and in particular, during injection or infusion, it is necessary to ensure that the impregnation material forms a plane as it progresses, which plane moves regularly from the side of the mold presenting the orifice for introducing the impregnation material towards the side of the mold presenting the vent orifice. Under such ideal circumstances, the impregnation front is said to be plane, whereas in the presence of bypass channels, the impregnation front is said to present more of a U-shape. There thus exists a need in this sense.

SUMMARY OF THE INVENTION

An embodiment of the invention provides a method for impregnating a fibrous preform by injection or infusion, the method comprising steps of:

providing a mold having at least two portions, said mold presenting at least one inlet orifice and at least one vent orifice placed on opposite sides of the mold;

placing a fibrous preform in a portion of the mold;

placing at least one thermo-expandable seal in at least one passage formed between an inside wall of the mold and the fibrous preform, said passage extending substantially along the direction extending between the opposite sides of the mold and respectively presenting the inlet orifice and the vent orifice;

closing the mold;

heating the mold so that the thermo-expandable seal expands and shuts off said passage; and impregnating the preform with an impregnation material.

Below, and unless specified to the contrary, the term "seal" should be understood as "thermo-expandable seal". Likewise, below, and unless specified to the contrary, the term "preform" should be understood as "fibrous preform".

It can be understood that the mold presents two opposite sides, one side presenting at least one inlet orifice for introducing the infusion material, while the opposite side presents at least one vent orifice for evacuating air and/or surplus infusion material. It can thus be understood that these two sides are opposite along an axial direction, the axial direction extending from one of these two opposite sides towards the other of these two opposite sides. It can also be understood that the axial direction corresponds to the direction in which the impregnation front advances within the mold.

At least one seal is placed solely in passages that are substantially parallel to the axial direction. The term "substantially parallel" should be understood as forming an angle lying in the range 0° to 45° with the axial direction. Naturally, the direction of a passage is considered overall. Thus, a passage may be considered as being substantially parallel to the axial direction even though it locally presents portions that form an angle of more than 45° with the axial direction. Naturally, for each passage fitted with a seal, it is possible to have one or more seals.

Naturally, within the mold, it is possible to have passages that do not extend substantially parallel to the axial direction, but for example extend in a direction that is transverse to the axial direction. Such passages are not filled in by the seal. On the contrary, such passages should not be shut off since, immediately downstream from the inlet orifice and immediately upstream from the fibrous preform, or else immediately downstream from the fibrous preform and immediately upstream from the vent orifice (where "upstream" and "downstream" are considered in the flow direction of the impregnation material), these passages can form manifolds for the impregnation material upstream or downstream from the fibrous preform, thereby enabling impregnation to be made uniform and enhancing the formation of an impregnation front that is plane (i.e. substantially perpendicular to the axial direction).

The thermo-expandable seal is naturally made of thermo-expandable material, i.e. material that expands when heated. Such materials are themselves known. Thus, by heating the closed mold, the seal is caused to expand so as to fill in the passage in which it is placed. The person skilled in the art is well aware that over at least a given temperature range, a thermo-expandable material is a material that presents a coefficient of thermal expansion that is greater than or equal to 0.6 percent per degree Kelvin (%/° K), i.e. 0.6 percent per degree Celsius (%/° C.).

By way of example, the impregnation material may be an organic material (e.g. a thermosetting or thermoplastic resin), a ceramic, or indeed a metal.

By means of the seal, the passage(s) (i.e. the bypass channels) extending in the axial direction is/are filled in. Thus, potential for the impregnation material to bypass the fibrous preform during impregnation is eliminated or at least significantly reduced. The impregnation material is thus forced to flow within the fibrous preform, thereby ensuring impregnation that is uniform and an impregnation front that is substantially plane. Furthermore, the seal serves to fill in any leaks that might be due to poor closure of the mold, e.g. if a fiber of the fibrous preform becomes caught between two portions of the mold or if the preform presents accidental excess thickness.

In some embodiments, at least one thermo-expandable seal is placed in all of the passages that extend between the opposite sides of the mold that respectively present the inlet orifice and the vent orifice.

This ensures that the impregnation material has strictly no possibility of bypassing the fibrous preform during impregnation via a passage that extends substantially parallel to the axial direction.

In some embodiments, the thermo-expandable seal is placed so that it extends in the mold over substantially the entire length of the fibrous preform between said opposite sides of the mold.

It can thus be understood that the seal extends in the passage over substantially the entire axial length of the fibrous preform. The term "substantially the entire length" should be understood as covering a distance lying in the range 50% to 105% of the length of the fibrous preform when the seal has not expanded, it being understood that the seal can also expand in the axial direction.

This makes it possible to avoid the impregnation material that is introduced into the fibrous preform subsequently flowing into a portion of the passage that was not filled in by the seal, which would otherwise disturb the progress of the impregnation front and consequently disturb the uniformity of impregnation.

In some embodiments, prior to the heating step, the area of the cross-section of the thermo-expandable seal is substantially equal to substantially half the area of the cross-section of the passage once the mold is closed.

The term "substantially half" should be understood as lying in the range 40% to 75% of the area of the cross-section of the passage. It can be understood that the cross-section of the seal (or of the passage) is the section of the seal (or of the passage) that is perpendicular to the axial direction when the seal is placed in the mold.

Such an area ratio makes it possible to avoid pinching the seal itself when closing the mold. This also serves not to generate excessive stresses on the fibrous preform after the seal has expanded as a result of heating, where such stresses would run the risk of deforming the fibrous preform, e.g. causing the fibrous structure to buckle if those stresses are too large.

In some embodiments, the thermo-expandable seal presents a coefficient of expansion lying in the range 50% to 60% and an expansion temperature higher than 60° C.

It can thus be understood that the thermo-expandable seal expands by 50% to 60% when heated to 60° C. starting from ambient temperature. Taking ambient temperature to be 20° C., the seal thus presents expansion of 50% to 60% at 80° C. Such expansion corresponds to a thermal expansion coefficient expressed in percentage per degree Kelvin (%/° K) lying respectively in the range 0.8%/° K to 1.0%/° K (i.e. 0.8%/° C. to 1.0%/° C.). Naturally, during impregnation, the temperature of the mold may rise above 80° C. The seal may possibly continue to expand above 80° C. For example, the coefficient of thermal expansion of the seal may be constant over a temperature range from 20° C. to 200° C. In another example, the coefficient of thermal expansion is not linear and presents a value that is smaller or even zero above 80° C. In other words, it can be understood that the seal is configured to shut off the passage at 80° C.

The forces generated by such a seal during its expansion do not affect the physical properties of a fibrous preform, in particular fibrous preforms that present a fiber volume fraction lying in the range 55% to 65%. Furthermore, such a coefficient of expansion enables the seal to be put into place easily between the mold and the fibrous preform without exerting any stress on the fibrous preform. By way of example, the expansion temperature may be about 100° C.

In some embodiments, the thermo-expandable seal presents a degradation temperature higher than the working temperature of the impregnation material.

By way of example, the working temperature is the temperature at which the impregnation material is injected or its curing or polymerization temperature. The degradation temperature is naturally the temperature above which the seal is no longer suitable for properly performing its sealing function.

In some embodiments, the impregnation material is a resin.

Such an impregnation method using a thermo-expandable seal is particularly well adapted to impregnating a fibrous preform with a resin. It should be observed that if the resin hardens (i.e. cures or polymerizes) at ambient temperature, it is possible to envisage a preliminary heating cycle in order to expand the seal before injecting the resin.

An embodiment also provides a method for fabricating a matrix reinforced by a fibrous preform, the method comprising the steps of:

impregnating a fibrous preform in accordance with the method according to embodiments described in the present disclosure for impregnating a fibrous preform, thereby obtaining a reinforced raw matrix; and machining at least a portion of the reinforced raw matrix that was in contact with the seal during impregnation.

The term "machining" is used to cover any operation consisting in removing material by means of a machine tool, e.g. cutting, drilling, planing, sanding, piercing, milling, etc.

It can thus be understood that the portion of the raw matrix that corresponds to the portion of impregnation material that has solidified in contact with the seal is machined, in particular in order to eliminate imperfections that result from the presence of the seal.

BRIEF DESCRIPTION OF THE DRAWINGS

The invention and its advantages can be better understood on reading the following detailed description of various embodiments of the invention given as non-limiting examples. The description refers to the sheets of the accompanying figures, in which.

DETAILED DESCRIPTION OF EMBODIMENTS

The figures show a mold, a thermo-expandable seal, and a fibrous preform in highly diagrammatic manner in order to clarify the present disclosure. The person skilled in the art will naturally have no difficulty in transposing the teaching of the present disclosure to shapes that are appropriate for fabricating real parts of shapes that are more complex.

Figure 1A:
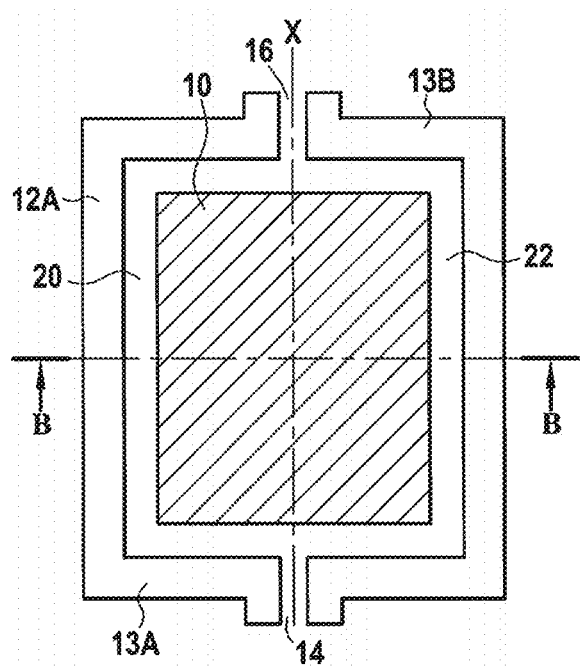
FIGS. 1A and 1B show a first step in an impregnation method in which a fibrous preform is placed in a portion of a mold.
Figure 1B:
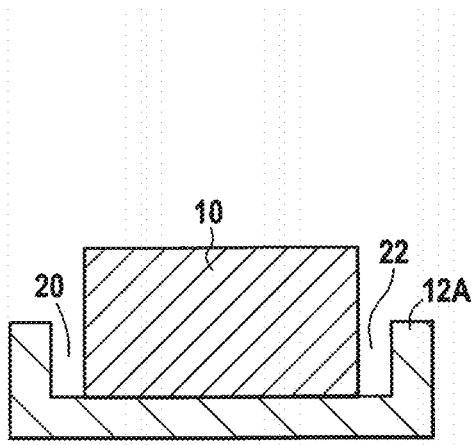

The impregnation method is described with reference to FIGS. 1A to 4. It should be observed that FIGS. 1B and 2B are respectively views of FIGS. 1A and 2A on section plane B as shown in FIG. 1A. Nevertheless, in FIG. 2B, the second mold portion 12B is shown, while it is not shown in FIG. 2A.

FIGS. 1A and 1B show a first step during which a fibrous preform 10 is placed within a portion 12A of a mold 12. The mold 12 has an inlet orifice 14 for introducing an impregnation material into the mold. The mold 12 also has a vent orifice 16 for evacuating air and/or surplus impregnation material during impregnation.

The inlet orifice 14 and the vent orifice 16 are placed on two opposite sides 13A and 13B of the mold 12. These sides are opposite along an axial direction X. In this example, the mold 12 is of rectangular shape and the axial direction extends parallel to the long side of the rectangular shape. Naturally, the orifices could be placed on the short sides of the rectangular shape, in which case the axial direction extends parallel to the short sides of the rectangular shape. More generally, the axial direction is the direction that extends between any pair of opposite sides, these sides presenting respectively the inlet orifice and the vent orifice.

Passages 20 and 22, formed between the preform 10 and the inside walls of the mold 12, extend in the direction that extends between the opposite walls 13A and 13B. In other words, the passages 20 and 22 extend between the preform 10 and the mold 12 in a direction that is substantially parallel to the axial direction X. In this example, the passages 20 and 22 are parallel to the axial direction X.

Figure 2A:
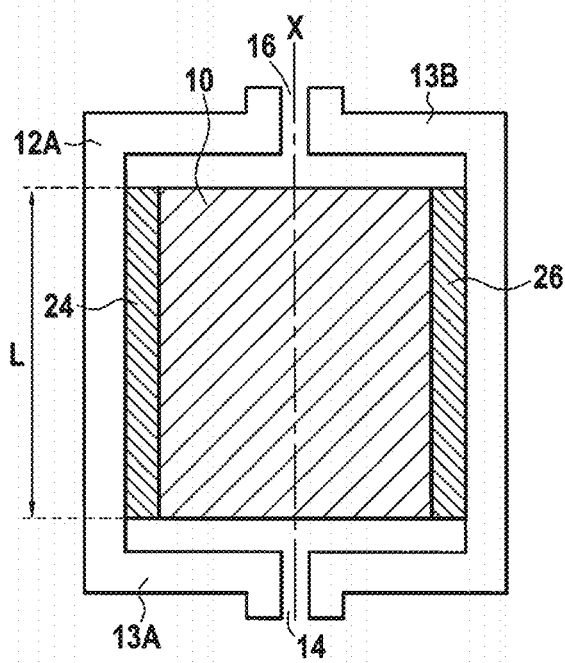
FIGS. 2A and 2B show a second step of the impregnation method in which a thermo-expandable seal is placed between the preform and a wall of the mold.
Figure 2B:
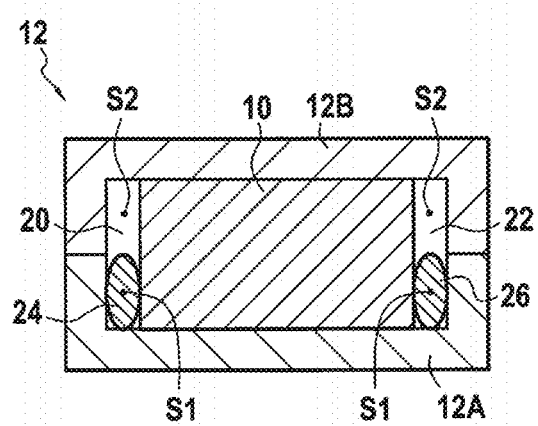

A second step of the impregnation method is shown in FIGS. 2A and 2B. During this second step, thermo-expandable seals 24 and 26 are placed respectively in the passages 20 and 22. In this example, the seals 24 and 26 are placed in such a manner as to extend over substantially the entire length of the preform 10 as considered between the opposite sides 13A and 13B of the mold 12 (i.e. the axial length of the preform). In this example, the seals 24 and 26 extend over 100% of the length L of the preform 10.

Naturally, it can be understood that the first step and the second step could be performed in the opposite order: specifically, it is possible to place the preform 10 in a portion of the mold 12 before putting the seal(s) 24 or 26 into place, or vice versa. Or indeed, it is possible to place at least one seal in a portion of the mold, then to put the preform into place, and then put at least one other seal into place.

In FIG. 2B, the second portion of the mold 12B is also shown, corresponding to the overall configuration after the step of closing the mold. It can be seen that the cross-section S1 of the seals 24 and 26 is substantially equal to half the cross-section S2 of the passages 20 and 22. In this example, the seals and the passages present cross-sections that are identical, however these cross-sections could naturally differ from one seal to the other and from one passage to the other.

Figure 3:
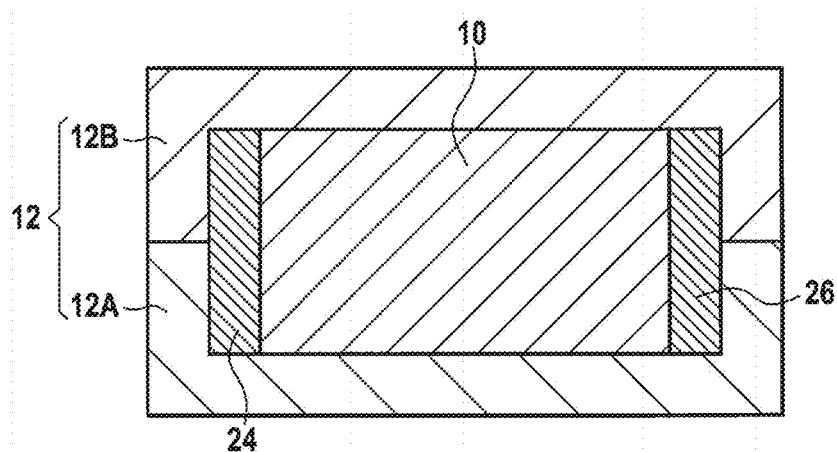
FIG. 3 shows a third step of the impregnation method in which the mold is heated so that the seal expands.

FIG. 3 shows the assembly after the mold has been heated: the thermo-expandable seals 24 and 26 have expanded and shut off the passages 20 and 22 respectively. It should be observed that in this example the seal presents an expansion coefficient of about 60%, thereby enabling it to fill in the passages 20 and 22 easily.

Figure 4:
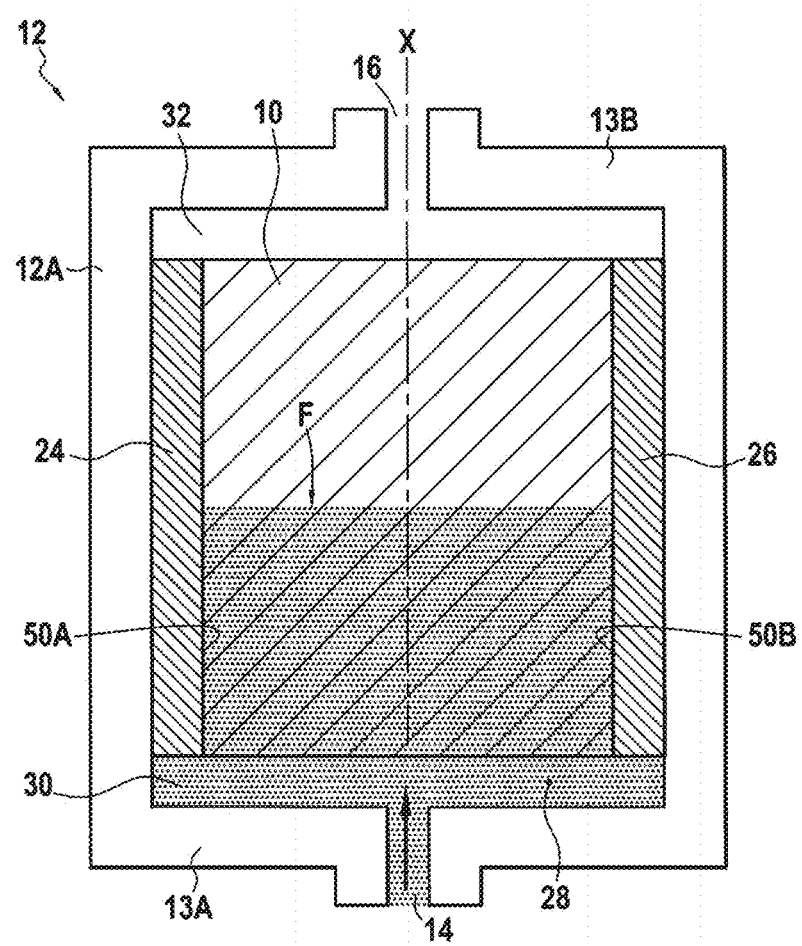
FIG. 4 shows a fourth step of the impregnation method in which the preform is impregnated.

FIG. 4 shows the FIG. 3 assembly during the step of impregnating the preform 10. In this example, impregnation is performed by injecting resin 28, however it is naturally possible to perform impregnation by infusion. Likewise in this example the impregnation material is a resin, but other materials such as a ceramic or a metal could equally well be envisaged. The material of the seal should therefore be selected accordingly. In particular, in this example, the expansion temperature of the seal is 100° C., while its degradation temperature is higher than the polymerization temperature of the resin.

As shown in FIG. 4, as a result of the seals 24 and 26 that have expanded and that have shut off the passages 20 and 22, the resin 28 is forced to pass through the fibrous preform 10, whereby the resulting injection front F is substantially plane. It should be observed in this example that a passage 30 perpendicular to the axial direction X is left upstream from the preform 10 between the preform 10 itself and the mold 12. This passage 30 forms an inlet manifold serving to diffuse the resin 28 uniformly within the preform 10. Likewise, a passage 32 perpendicular to the axial direction X is provided downstream from the preform 10 between the preform 10 itself and the mold 12. This passage 32 forms an outlet manifold enabling the resin 28 that has passed through the preform 10 to leave in uniform manner, thereby obtaining uniform diffusion and thus uniform impregnation of the resin 28 within the preform.

Figure 5:
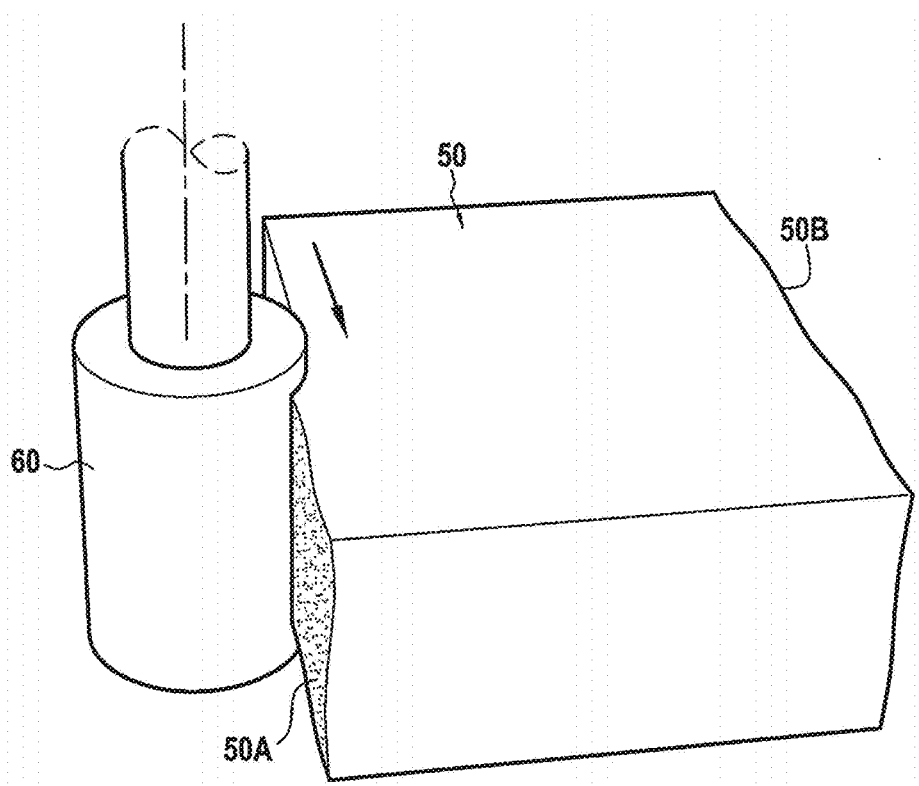
FIG. 5 shows a step of machining the raw matrix reinforced with the fibrous preform as obtained after the step shown in FIG. 4 at the end of the impregnation method.

At the end of the impregnation method as described with reference to FIGS. 1A to 4, a raw matrix 50 is obtained that is reinforced by a fibrous preform. This impregnation method forms the first step in a method for fabricating a matrix reinforced by a fibrous preform. An optional following step of the fabrication method comprises machining at least a portion of the raw preform in contact with a seal in the mold 12. FIG. 5 shows such a machining step. In this example, the machining is performed using a cutter 60 to mill an edge 50A of the reinforced raw matrix 50, which edge 50A is adjacent to the seal 24 in the mold 12. The edge 50B adjacent to the seal 26 in the mold 12 may also be milled. For clarity of description, although in the step shown in FIG. 4 the raw matrix 50 is not yet formed in full, the references 50A and 50B are nevertheless marked on the corresponding portions of the preform 10 while it is being impregnated.

Although the present invention is described with reference to specific embodiments, it is clear that modifications and changes may be undertaken on them without going beyond the general ambit of the invention as defined by the claims. In particular, individual characteristics of various embodiments shown and/or mentioned may be combined in additional embodiments. Consequently, the description and the drawings should be considered in a sense that is illustrative rather than restrictive.

It is also clear that all of the characteristics described with reference to a method are transposable, singly or in combination, to a device, and vice versa, all of the characteristics described with reference to a device are transposable, singly or in combination to a method.

The invention claimed is:

1. A method for impregnating a fibrous preform by injection or infusion, comprising steps of:
providing a mold having at least two portions, said mold presenting at least one inlet orifice and at least one vent orifice placed on opposite sides of the mold;
placing a fibrous preform in a portion of the mold;
placing at least one thermo-expandable seal in at least one passage formed between an inside wall of the mold and the fibrous preform, said passage extending substantially along the direction extending between the opposite sides of the mold and respectively presenting the inlet orifice and the vent orifice;
closing the mold, wherein prior to the heating step, the area of the cross-section of the thermo-expandable seal is substantially equal to half the area of the cross-section of the passage once the mold is closed;
heating the mold so that the thermo-expandable seal expands and shuts off said passage, the at least one thermo-expandable seal contacting the inside wall of the mold and a side of the fibrous preform; and
impregnating the fibrous preform with an impregnation material.

2. A method for impregnating a fibrous preform according to claim 1, wherein the thermo-expandable seal is placed so that it extends in the mold over substantially the entire length of the fibrous preform between said opposite sides of the mold.

3. A method for impregnating a fibrous preform according to claim 1, wherein the thermo-expandable seal presents a coefficient of expansion lying in the range 50% to 60% and an expansion temperature greater than 60° C.

4. A method for impregnating a fibrous preform according to claim 1, wherein the thermo-expandable seal presents a degradation temperature higher than a working temperature of the impregnation material.

5. A method for impregnating a fibrous preform according to claim 1, wherein the impregnation material is a resin.

6. A method for fabricating a matrix reinforced by a fibrous preform comprising the steps of:
impregnating a fibrous preform in accordance with the method according to claim 1 for impregnating a fibrous preform, thereby obtaining a reinforced raw matrix; and
machining at least a portion of the reinforced raw matrix that was in contact with the thermo-expandable seal during impregnation.

* * * * *